United States Patent

[11] 3,594,056

| [72] | Inventor | Gerald S. Sager |
| | | Frankfort, Ill. |
| [21] | Appl. No. | 790,582 |
| [22] | Filed | Jan. 13, 1969 |
| [45] | Patented | July 20, 1971 |
| [73] | Assignee | Sager Industries Incorporated |
| | | Frankfort, Ill. |
| | | a part interest |

[54] FURNITURE ASSEMBLY AND CONNECTOR THEREFOR
4 Claims, 6 Drawing Figs.

| [52] | U.S. Cl. | 312/263 |
| [51] | Int. Cl. | A47b 47/00 |
| [50] | Field of Search | 312/257- |
| | | —265, 228; 248/222; 52/285; 287/189.36 D, |
| | | 189.36 C, 20.92 C, 20.92 W, 20.92 D |

[56] References Cited
UNITED STATES PATENTS

| 651,541 | 6/1900 | Wright | 52/285 |
| 740,235 | 9/1903 | Coffin | 52/285 |
| 794,447 | 7/1905 | Bickford | 52/285 |
| 984,267 | 2/1911 | Ferres | 52/28.5 X |
| 2,516,933 | 8/1950 | Wallance | 189/36 C |
| 3,070,646 | 12/1962 | Lindgren | 52/285 X |
| 3,353,317 | 11/1967 | Ensor | 52/285 X |
| 3,479,070 | 11/1969 | Marateck et al. | 287/20.92 C |

*Primary Examiner*—Richard J. Scanlan, Jr.
*Assistant Examiner*—Geo. V. Larkin
*Attorney*—Anderson, Luedeka, Fitch, Even and Tabin ABSTRACT: A connector is formed with a rigid bracket having clamping means including bearing members for insertion into substantially T-shaped grooves in knocked down wall member of a furniture assembly such as a vanity, cabinet or the like. The bearing members are dimensioned to permit adjusting movement of the wall members in directions parallel or normal to the longitudinal dimension of the respective grooves. When the wall members are in the desired positions, the clamping means is tightened to rigidly lock the wall members in this position.

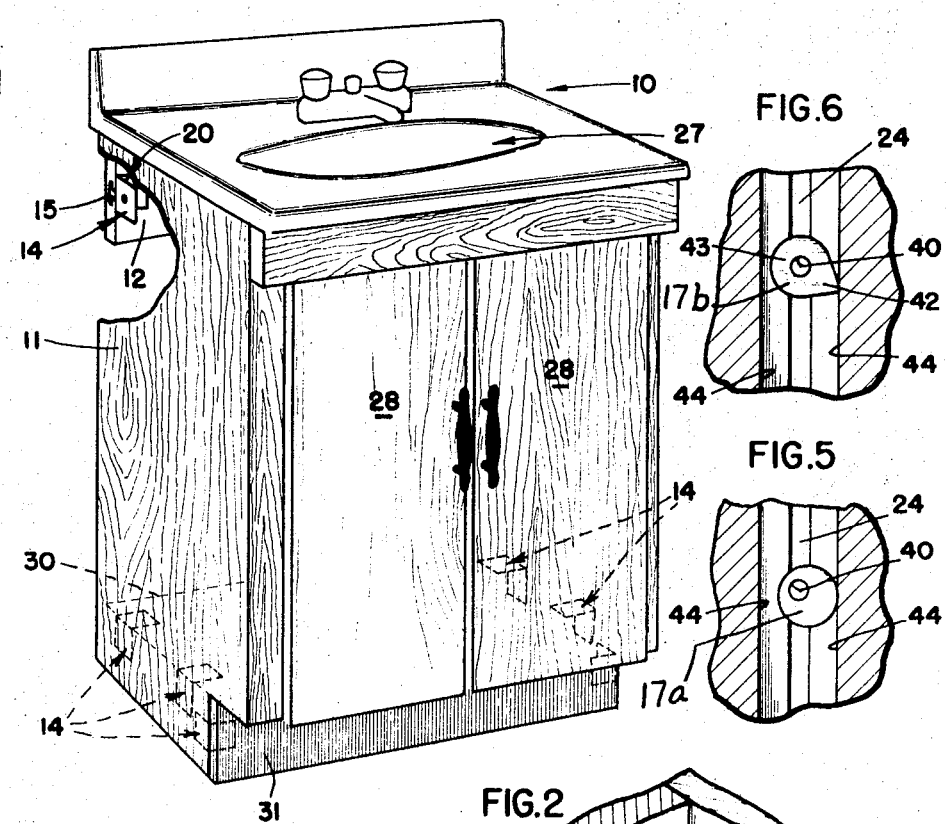
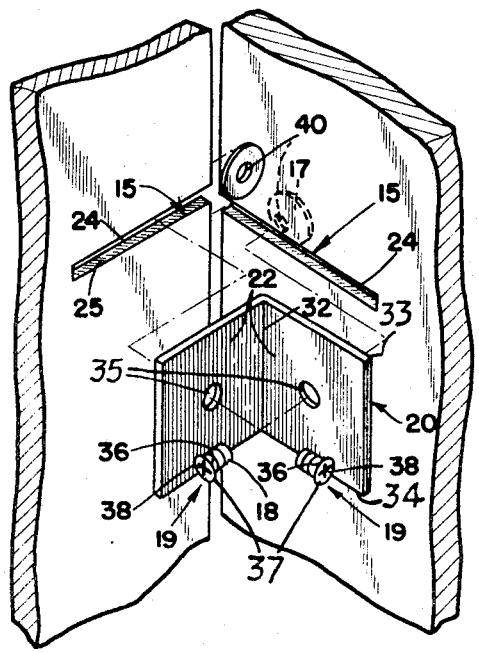
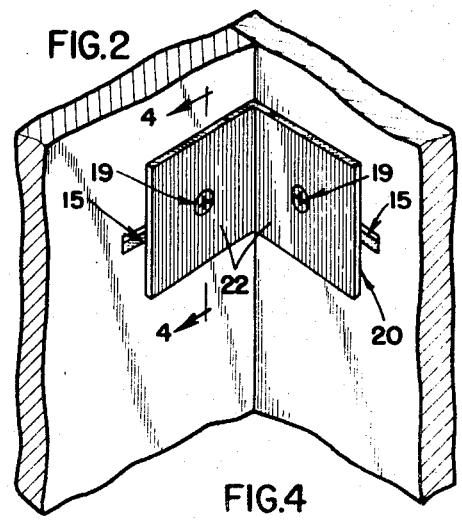
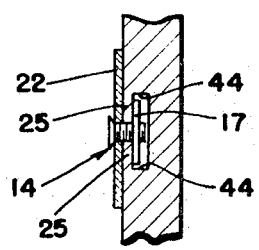
INVENTOR
GERALD S. SAGER 3,594,056

FURNITURE ASSEMBLY AND CONNECTOR THEREFOR

This invention relates to a connector for joining two intersecting wood or woodlike members such as panels, sidewalls, bottom walls, aprons, rails, stiles, shelves or tops of furniture assemblies such as cabinets, vanities, sinks or the like, and to furniture assemblies erected with such connectors and intersecting members.

Substantial savings in shipping costs are being realized by manufacturers by shipping bulky cabinets, vanities, shelvings or the like in a knocked-down condition from a factory to an on the job location for erection and assembly. The separate panels, shelves and tops etc., hereinafter referred to simply as "wall members," are quickly erected and joined usually by brackets and screws which are to be screwed into preformed or started openings therefore in the members. One difficulty being experienced with assembly of the knocked-down parts by brackets and screws is that the screw holes are not properly aligned when the intersecting members are erected and aligned in the desired positions. This necessitates relocating or restarting screws which is not only aggravating, but is a time-consuming and cost-defeating process. Although the members are usually made to standard dimensions within usually acceptable dimensional tolerances, the accumulation of such tolerances sometimes results in misalignment of the screw holes or brackets connecting the member at a joint. Moreover, discrepancies from nominal dimensions and nominal tolerances for parts are found in commercial practice and this compounds the difficulty of assembly and alignment of parts.

In accordance with the present invention, knocked-down members made of wood, pressed wood, flake board, plywood or the like may be quickly assembled and joined by simple low-cost connectors which are slidably received in grooves or channels formed or machined in the respective edges of faces of the members. The connectors are so designed that a wall member may be shifted in either of two directions to the desired position relative to other wall members and then rigidly clamped in this position with sufficient force to withstand normal usage. The connectors and grooves are so related to eliminate the necessity for lining or otherwise reinforcing the grooves in the wall members. Such lining of grooves is expensive.

Accordingly, a general object of the present invention is to provide an improved connector and furniture assembly of knocked-down wall members.

FIG. 1 is a perspective view of a vanity type of furniture assembly with a portion cut away to expose wall members and a connector embodying novel features of the invention;

FIG. 2 is an enlarged fragmentary perspective view of a connector joining intersecting wall members;

FIG. 3 is an exploded perspective view of the connector and wall members of FIG. 2;

FIG. 4 is a cross-sectional view taken along a line 4—4 of FIG. 2;

FIG. 5 is a fragmentary view of a nutlike member or bearing member constructed in accordance with a further embodiment of the invention; and FIG. 6 is a fragmentary view of a nutlike member or bearing member constructed in accordance with another embodiment of the invention.

As shown in the drawings for purposes of illustration the invention is embodied in a furniture assembly 10 of the vanity kind which is constructed from various members which may be shipped in knocked-down form and then erected to form the illustrated vanity. A quick alignment and assembly of the various members of the vanity are achieved by joining several of the members such as a vertical sidewall member 11 and an intersecting back rail wall member 12 by means of connectors 14. The knocked-down wall members 11 and 12 are made of wood, pressed wood, flake board, plywood or the like and are formed or machined with a substantially T-shaped groove 15 to receive therein a first thin, flat, bearing member 17 (FIG. 3) of clamping means carried by the connectors 14. In this instance, the bearing member 17 is like a nut in that it is tapped to receive the shank 18 of a threaded member or screw 19 carried on an angle shaped bracket 20 of the connector 14.

When assembling the wall members 11 and 12, the grooves 15 in the respective members are generally aligned and bearing members 17 are inserted into grooves 15 and slid therein while bracket legs 22 of the bracket 20 are brought into face-to-face relationship with the respective wall members 11 and 12. As the screw shanks 18 are smaller in diameter than the width of open slots 24 of the grooves 15 and the bearing members 17 have dimensions smaller than the transverse dimension of the grooves 15, the panels 11 and 12 may be shifted or moved angularly relative to one another sufficiently to align them in the desired relationship to one another and to other joined wall members. When the panels 11 and 12 are aligned in the desired arrangement, the screws 19 are turned in the bearing members 17 to clamp the latter against inturned shoulders or walls for the grooves 15 and thereby tightly to the respective wall members. Thus, the connectors 14 may join the wall members in a fixed and desired relationship.

The connectors 14 are particularly advantageous in that the respective wall members to be joined thereby may be shifted and moved through distances which would cause misalignment of start holes or screw locations in the wall members and openings therefore in brackets if they were to be secured by screws in accordance with the customary prior art practice. Thus, there is provided a furniture assembly 10 which may be shipped knocked down, may be quickly and easily assembled, and may be sufficiently rugged to withstand normal useage.

Referring now to the invention in greater detail, the illustrated vanity is of the type which receives a sink 27 at the top thereof. A pair of hinged doors 28 are provided and may be opened to expose the vanity interior. When assembling the vanity, the wall members are usually joined to several other members of the vanity by several connectors 14, although for the sake of simplicity the invention is described hereinafter in connection with only one connector 14 and the wall members 11 and 12. In a like manner, similar connectors 14 may be used to join other wall members such as a bottom wall 30, a toe kick panel 31, shelves, stiles, or other members. Also, it is to be understood that other partitions or members not mentioned may also be joined by the connectors 14.

As a relatively large number of connectors 14 may be used for any one cabinet, the cost of the connectors is an important factor. In this instance, the illustrated bracket is formed of sheet metal with each of the bracket legs 22 joined rigidly to one another at a common band or corner 32. In most instances, the bracket legs will be disposed substantially at right angles to one another to join wall members at a right-angle joint or corner. The preferred width of the bracket legs between edges 33 and 34 is at least as great as the width of the groove 15.

For example, the bracket legs, in the illustrated embodiment of the invention, measure 2 inches in width and 2 inches in length. The 2 inches in width for each of the illustrated brackets corresponds to a maximum width dimension for the groove 15 of 1 inch. Thus, the bracket legs will extend 0.500 inch beyond the groove when a screw-receiving aperture 35 in each bracket leg is centered in the open slot 24 of its groove 15. In the preferred embodiment of the invention, the screw-receiving apertures 35 are formed with a tapered side which is complementary to the taper 36 of the heads 37 of the screws 19. The tapered screwheads 37 seat in the apertures and may be disposed to be substantially flush with the outer surface of the associated bracket leg.

In the illustrated embodiment of the invention, the screws 19 have shanks 18 which have a diameter substantially less than the width of the slot 24 receiving the shanks. For example, illustrated screws 19 have a 3/16-inch-diameter shank and the slotted opening 24 is three-eights inch in width or twice as large. The illustrated screws 19 are formed with a cross-shaped slot 38 to receive a screwdriver to turn the screws relative to the threaded bearing members 17.

The bearing members 17 are preferred to provide relatively large surfaces or areas of contacting the inturned shoulder 25 and for distributing forces to the inturned shoulders. The bearing members 17 may be made inexpensively by using flat sheet metal washers having an aperture 40 designed to receive the thread of the screw 19. An alternative bearing member 17a is circular disc with the aperture 40 offset from the center thereof, as seen in FIG. 5. Another form of bearing member 17b (FIG. 6) is formed from a flat sheet of metal with a pointed portion 42 projecting from an otherwise circular portion 43 which has the aperture 40. When the screw 19 is turned to clamp the bracket 20 to the wall members 11 and 12, the bearing members 17a and 17b turn and abut one of a pair of spaced vertical sidewalls 44 for its groove 15. Thus, the bearing member is held against further turning movement as the screw pulls the bearing member 17 against the inturned shoulder 25 to exert a clamping force thereon with the screw head 37 also serving as a bearing member and exerting a clamping force on its leg 22 of the bracket 20. When the bearing member 17b is first inserted into the groove 15, its pointed portion 42 is disposed generally longitudinally in the groove 15 and is free to move laterally towards either one of the groove sidewalls 44 as its associated wall member is moved in either one of two directions, i.e. in directions parallel or transverse to the longitudinal dimension of the groove 15.

In the preferred embodiment of the invention the thickness of the shoulders 25 is made quite wide, for example, three-sixteenth of an inch, to withstand forces applied thereto. The length of the grooves 15 may be less than the 2-inch length of the bracket legs so that the grooves will be hidden and covered by the bracket legs when the panels are assembled.

From the foregoing it will be seen that knocked-down furniture assemblies having intersecting vertical wall members and intersecting horizontally disposed wall members may be readily assembled and shifted into desired positions despite deviations from standard dimensions. As the bearing members are free to shift in directions parallel or transverse to its receiving groove 15, the T-shaped grooves 15 provide sufficient strength without being lined with other materials to withstand normal usage.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. A connector for permitting adjustment of wall members into and for fastening the latter in a predetermined, intersecting relationship, each of said wall members having an elongated substantially T-shaped groove having a bottom wall, spaced sidewalls extending from said bottom wall, and inturned walls spaced from said bottom wall and defining an open slot therebetween, said grooves being disposed substantially in intersecting alignment, so as to define a plane perpendicular to said wall members, said connector comprising an angle-shaped bracket having first and second legs rigidly joined at a predetermined angle, clamping members associated with each of said bracket legs for clamping thereto one of said wall members, each of said clamping members having a first bearing member for bearing against said leg, a shank projecting from said first bearing member into a respective groove, and a second bearing member in said groove for bearing against the undersides of said inturned walls, said shank having a diameter less than the dimension of said open slot to permit said shank to slide therein and its associated wall member to be shifted in and normal to the longitudinal dimension of said elongated groove, said second bearing member engaged by said shank and having at least one dimension substantially less than the distance between said walls of said groove to permit its associated wall member to be shifted in and normal to the longitudinal dimension of said elongated groove, said wall members thereby being shifted angularly relative to one another, and thread means on said shank threadingly engaging at least one of said bearing members so that a relative turning movement therebetween results in a relative axial displacement of said first and second bearing members toward each other to clamp said wall member to said leg in the adjusted, predetermined intersecting relationship.

2. The connector of claim 1 in which said second bearing member has a noncircular configuration and has a portion for abutting one of the sidewalls of said groove and thereby limit its rotation upon turning.

3. In a cabinet structure, the combination of a plurality of abutted panel or wall members of woodlike material disposed in intersecting planes, each of said wall members having a substantially T-shaped groove therein, said grooves being disposed substantially in intersecting alignment, so as to define a plane perpendicular to said wall members, said T-shaped grooves having a bottom wall and sidewalls extending substantially normal from said bottom wall, said grooves having inturned shoulders joined to said sidewalls and spaced from said bottom wall, said inturned shoulders being spaced from said bottom wall and being spaced from each other and defining an open slot therebetween, and connector means for clamping and rigidly joining said members in a predetermined aligned relationship, said connector means including an angle-shaped bracket having first and second legs rigidly joined at a predetermined angle, each of said legs aligning with and being at least as wide as an associated groove, an aperture in each of said legs, clamping means for clamping each respective leg against a wall member upon insertion of a portion thereof into a groove of its respectively associated wall member, each of said clamping means including a screw having a shank extending through said aperture and projecting into the slot of said groove and further including a thin, flat bearing member in said groove having an aperture threaded onto said screw shank and shaped to abut one of said sidewalls and limit turning and to move axially upon turning of said screw shank to bear against said inturned shoulders of said groove and to clamp its associated leg thereto.

4. A furniture assembly comprising a plurality of intersecting wall members disposed in substantially vertical planes and intersecting each other in a predetermined relationship to define corners for said furniture assembly, at least one substantially T-shaped groove being located in each of said wall members adjacent each said corner, said grooves being disposed substantially in intersecting alignment, so as to define a plane perpendicular to said vertically disposed wall members, at least one additional wall member disposed in a substantially horizontal plane and intersecting said vertically disposed wall members at a predetermined intersecting relationship, at least one substantially T-shaped groove being located in said horizontally disposed wall member adjacent a substantially T-shaped groove located in one of said vertically disposed wall members, such that said grooves are disposed substantially in intersecting alignment so as to define a plane perpendicular to said one of said vertically disposed wall members and said horizontally disposed wall member, and connecting means for permitting adjusting movement of said wall members angularly relative to one another and for fastening the latter in a predetermined, intersecting relationship, each said connecting means including an angle-shaped bracket having first and second legs rigidly joined at an angle and abutting against respective surfaces of a pair of said plurality of wall members at the location of said T-shaped grooves in said pair of wall members, a threaded member carried by each of said legs for projecting from said leg into an associated groove, and a bearing member slidably received in said T-shaped groove and dimensioned to permit adjusting movement of its associated wall member in directions longitudinally and transverse to its associated groove, said bearing member being larger than the opening of said T-shaped groove and threadingly engaged with said threaded member and movable with turning of its associated threaded member to clamp said wall member tightly to said bracket leg.

UNITED STATES PATENT OFFICE
CERTIFICATE OF CORRECTION

Patent No. 3,594,056  Dated July 20, 1971

Inventor(s) Gerald S. Sager

It is certified that error appears in the above-identified patent and that said Letters Patent are hereby corrected as shown below:

In Item [73], change to read --Assignee, Sager Industries Incorporated, by mesne assignments--

In the Abstract, line 4, "member" should read --members--

Column 3, line 2, "of contacting" should read --for contacting--

Signed and sealed this 7th day of March 1972.

(SEAL)
Attest:

EDWARD M. FLETCHER, JR.
Attesting Officer

ROBERT GOTTSCHALK
Commissioner of Patents